(12) United States Patent
Chunduri et al.

(10) Patent No.: US 10,785,148 B2
(45) Date of Patent: Sep. 22, 2020

(54) OSPF EXTENSIONS FOR FLEXIBLE PATH STITCHNG AND SELECTION FOR TRAFFIC TRANSITING SEGMENT ROUTING AND MPLS NETWORKS

(71) Applicant: Telefonaktiebolaget LM Ericsson (publ), Stockholm (SE)

(72) Inventors: Uma S. Chunduri, Fremont, CA (US); Evgeny Tantsura, Palo Alto, CA (US); Amarnath Ammireddy, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 16/077,837

(22) PCT Filed: Apr. 1, 2016

(86) PCT No.: PCT/IB2016/051889
§ 371 (c)(1),
(2) Date: Aug. 14, 2018

(87) PCT Pub. No.: WO2017/141078
PCT Pub. Date: Aug. 24, 2017

(65) Prior Publication Data
US 2019/0058657 A1    Feb. 21, 2019

Related U.S. Application Data

(60) Provisional application No. 62/295,451, filed on Feb. 15, 2016.

(51) Int. Cl.
*H04L 12/723* (2013.01)
*H04L 12/721* (2013.01)
(Continued)

(52) U.S. Cl.
CPC .............. *H04L 45/50* (2013.01); *H04L 45/12* (2013.01); *H04L 45/34* (2013.01); *H04L 45/42* (2013.01); *H04L 45/04* (2013.01)

(58) Field of Classification Search
CPC ......... H04L 45/50; H04L 45/12; H04L 45/34; H04L 45/42; H04L 45/04; H04L 12/4662; H04L 45/22; H04L 45/64; H04L 45/72
See application file for complete search history.

(56) References Cited

U.S. PATENT DOCUMENTS

| 7,664,877 | B1 | 2/2010 | Sheth | |
| 9,531,627 | B1 * | 12/2016 | Alvarez | H04L 45/507 |
| 2017/0054626 | A1 * | 2/2017 | Sivabalan | H04L 45/021 |

FOREIGN PATENT DOCUMENTS

| CN | 104378292 | 2/2015 |
| EP | 3021536 | 5/2016 |

OTHER PUBLICATIONS

International Preliminary Report on Patentability for International Application No. PCT/IB2016/051889, dated Aug. 30, 2018, 11 pages.
(Continued)

*Primary Examiner* — Kibrom T Hailu
(74) *Attorney, Agent, or Firm* — Sage Patent Group

(57) ABSTRACT

A router operates in both a Segment Routing (SR) network portion and a Multiprotocol Label Switching (MPLS) network portion of a network that utilizes Open Shortest Path First (OSPF). The router receives an OSPF advertisement message originated by a mapping server that includes a sub-Type-length-value (sub-TLV) element that identifies a preferred type of path across the MPLS network portion for an identifiable set of traffic that is to be received by the router from the SR network portion. The router identifies, based at least in part upon the sub-TLV element, one path of a plurality of available paths across the MPLS network por-
(Continued)

tion for the identifiable set of traffic, and configures its forwarding plane to utilize the identified one path accordingly for the identifiable set of traffic. The OSPF advertisement message can be an OSPF LSA, and can carry an Extended Prefix Range TLV including the sub-TLV element.

15 Claims, 8 Drawing Sheets

(51) Int. Cl.
  *H04L 12/717* (2013.01)
  *H04L 12/715* (2013.01)

(56) References Cited

OTHER PUBLICATIONS

International Preliminary Report on Patentability for International Application No. PCT/IB2016/051890, dated Aug. 30, 2018, 11 pages.
Filsfils, et al., "Segment Routing interoperability with LDP; draft-ietf-spring-segment-routing-ldp-interop-00," IETF Network Working Group Internet-Draft, Oct. 14, 2015, 15 pages.
Filsfils, et al., "Segment Routing with MPLS data plane; draft-ietf-spring-segment-routing-mpls-02.text," IETF Standard Working Draft, Internet Society, Oct. 17, 2015, 14 pages.
International Search Report & Written Opinion, International Application No. PCT/IB2016/051889, dated Oct. 27, 2016, 15 pages.
International Search Report & Written Opinion, International Application No. PCT/IB2016/051890, dated Oct. 28, 2016, 15 pages.
International Standard ISO/IEC 10589:2002(E), Second Edition, Information technology—Telecommunications and information exchange between systems—Intermediate System to Intermediate System intra-domain routing information exchange protocol for use in conjunction with the protocol for providing the connection less-mode network service (ISO 8473), Nov. 15, 2002, 210 pages.
Lindem, et al., "OSPFv3 LSA Extendibility; draft-ietf-ospf-ospfv3-lsa-extend-13.txt," IETF Network Working Group Internet-Draft, Oct. 21, 2016, 37 pages.
Previdi, et al. "IS-IS Extensions for Segment Routing; draft-ietf-isis-segment-routing-extensions-06," IETF IS-IS for IP Internets Internet-Draft, Dec. 14, 2015, 39 pages.
Psenak, et al, "OSPF Extensions for Segment Routing; draft-ietf-ospf-segment-routing-extensions-05," Open Shortest Path First IGP, IETF Internet Draft, Jun. 26, 2015, 29 pages.
Psenak, et al., "OSPFv2 Prefix/Link Attribute Advertisement; draft-ietf-ospf-prefix-link-attr-13.txt," IETF Network Working Group Internet-Draft, Aug. 20, 2015, 17 pages.
Psenak, et al, "OSPFv3 Extensions for Segment Routing; draft-ietf-ospf-ospfv3-segment-routing-extensions-04," Open Shortest Path First IGP, IETF Internet Draft, Dec. 22, 2015, 33 pages.
RFC 3209: Awduche, et al., "RSVP-TE: Extensions to RSVP for LSP Tunnels," Network Working Group, The Internet Society, Request for Comments: 3209, Dec. 2001, 61 pages.

\* cited by examiner

NON-SPECIFIC PREFERENCE SUB-TLV ELEMENT 200

SPECIFIC PREFERENCE SUB-TLV ELEMENT FOR OSPF 250

SPECIFIC PREFERENCE SUB-TLV ELEMENT FOR IS-IS 275

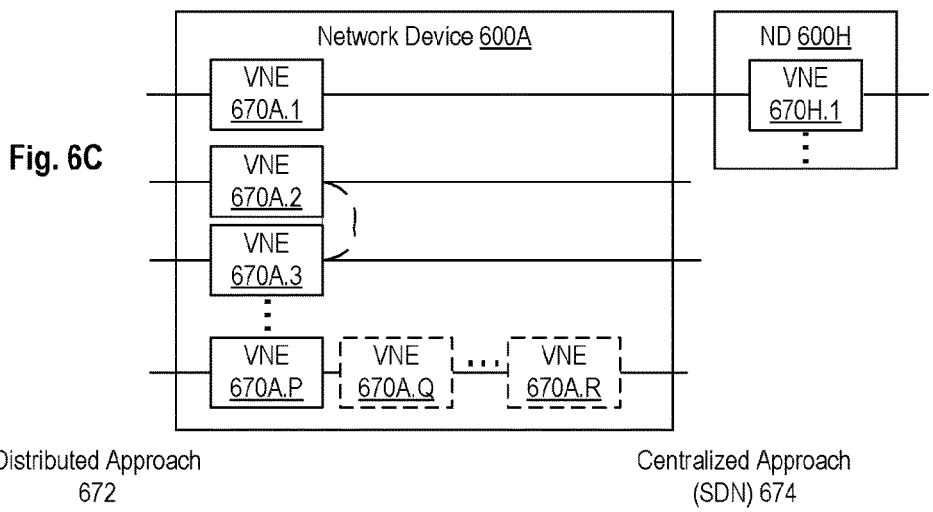
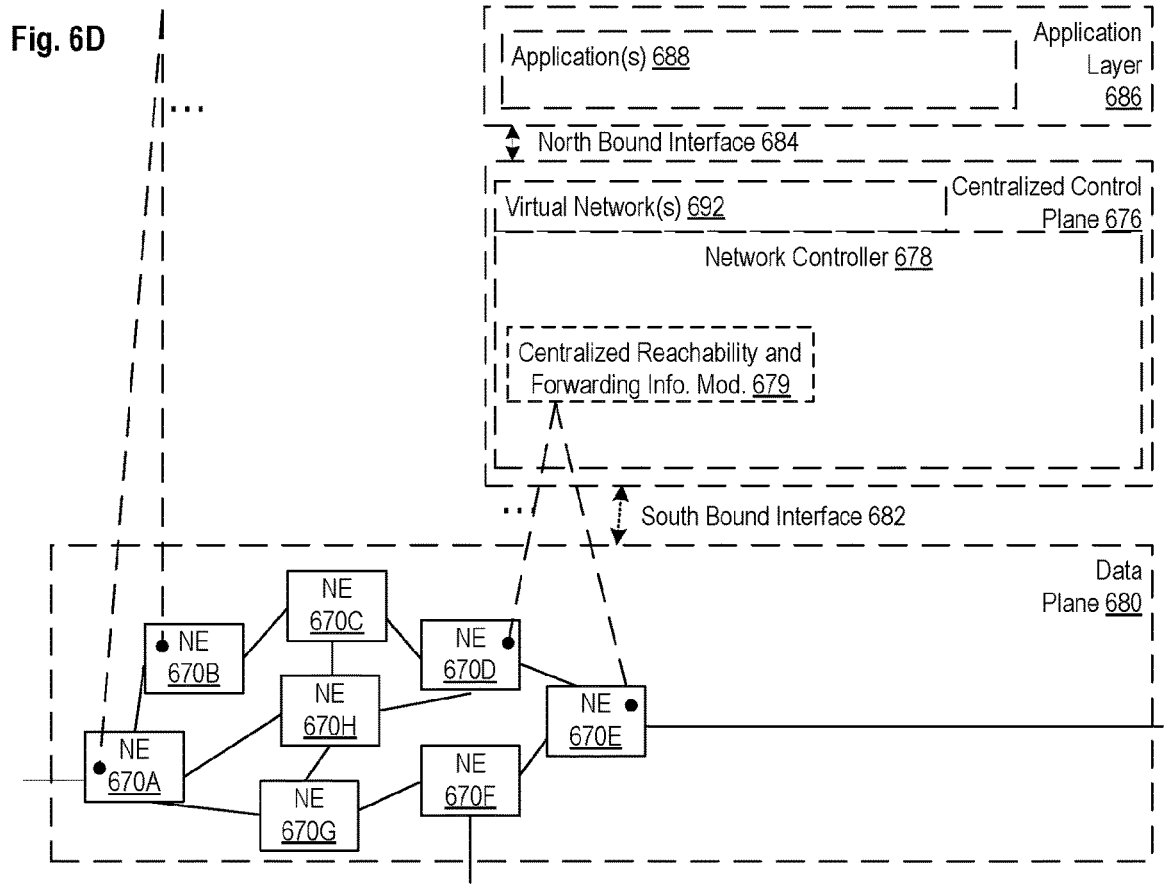
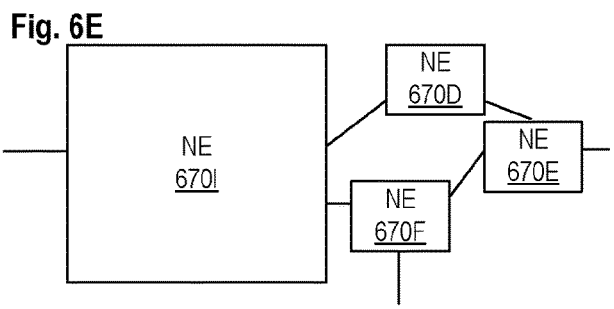
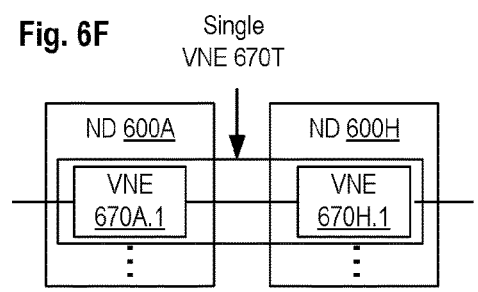

OSPF EXTENSIONS FOR FLEXIBLE PATH STITCHNG AND SELECTION FOR TRAFFIC TRANSITING SEGMENT ROUTING AND MPLS NETWORKS

CROSS-REFERENCE TO RELATED APPLICATIONS

This application is a National stage of International Application No. PCT/IB2016/051889, filed Apr. 1, 2016, which claims priority to U.S. Application No. 62/295,451, filed Feb. 15, 2016, which are hereby incorporated by reference.

FIELD

Embodiments of the invention relate to the field of computer networking; and more specifically, to Open Shortest Path First (OSPF) extensions for flexible path stitching and selection for traffic transiting Segment Routing and Multiprotocol Label Switching (MPLS) networks.

BACKGROUND

A Segment Routing (SR) node steers a packet through a controlled set of instructions, called segments, by prepending the packet with an SR header. A segment can represent any instruction, topological or service-based. SR allows a flow to be enforced through any topological path and service chain while maintaining per-flow state only at the ingress node to the SR domain.

The Segment Routing architecture can be directly applied to the MPLS data plane with no change in the forwarding plane. An Internet Engineering Task Force (IETF) Internet-draft ("Segment Routing interoperability with LDP," "draft-ietf-spring-segment-routing-ldp-interop-00," dated Oct. 14, 2015) describes how Segment Routing can operate in a network where Label Distribution Protocol (LDP) is deployed and in the case where SR-capable and non-SR-capable nodes coexist.

One technique for interoperating a SR domain and a LDP domain utilizes a functionality referred to as a mapping server. A mapping server can be configured to advertise mapping information that is only understood by SR-capable routers, and cause the SR-capable routers to install the related node segments in the MPLS data plane exactly like if the node segments had been advertised by the nodes themselves.

SUMMARY

A method in a device implementing a router network element is described. The router network element is part of a network including a SR network portion and a MPLS network portion. The router network element is part of both the SR network portion and the MPLS network portion, and the network also utilizes an Interior Gateway Protocol (IGP) for exchanging routing information. The method includes receiving, at the router network element, an IGP advertisement message originated by a mapping server. The IGP is Open Shortest Path First (OSPF). The IGP advertisement message includes a sub-Type-length-value (sub-TLV) element that identifies a preferred type of path across the MPLS network portion for an identifiable set of traffic that is to be received from the SR network portion. The method further includes identifying, by the router network element based at least in part upon the sub-TLV element, one path of a plurality of available paths across the MPLS network portion for the identifiable set of traffic. The method also includes configuring, by the router network element, a forwarding plane of the router network element to utilize the identified one path to forward any received traffic from the SR network portion that can be determined to belong to the identifiable set of traffic.

In some embodiments, the method further includes receiving, at the router network element from another network element operating in the SR network portion but not in the MPLS network portion, one or more packets that belong to the identifiable set of traffic, and transmitting, by the router network element, the one or more packets according to the identified one path over the MPLS network portion.

In some embodiments, the preferred type of path comprises an RSVP tunnel, a static MPLS path, or a labeled Border Gateway Protocol (BGP) path.

In some embodiments, the sub-TLV element is carried by an OSPF Extended Prefix Range TLV. In some embodiments, the sub-TLV includes a Segment Identifier (SID) value that identifies the preferred type of path but does not uniquely identify a specific path, and the identifying the one path is based upon the SID value.

In some embodiments, the sub-TLV includes a LSP (Label-switched path) value and a tunnel identifier (ID) value, the sub-TLV identifies a specific path across the MPLS network portion, and the identifying the one path is based upon the LSP value and the tunnel ID value.

A non-transitory computer-readable storage medium has instructions which, when executed by one or more processors of an electronic device, cause the electronic device to implement a router network element that performs operations and that is to be part of a network including a SR network portion and a MPLS network portion. The router network element is to be part of (e.g., operate within) both the SR network portion and the MPLS network portion. The network also utilizes an IGP for exchanging routing information. The IGP is OSPF. The operations include receiving an IGP advertisement message originated by a mapping server. The IGP advertisement message includes a sub-TLV element that identifies a preferred type of path across the MPLS network portion for an identifiable set of traffic that is to be received from the SR network portion. The operations also include identifying, based at least in part upon the sub-TLV element, one path of a plurality of available paths across the MPLS network portion for the identifiable set of traffic. The operations also include configuring a forwarding plane of the router network element to utilize the identified one path to forward any received traffic from the SR network portion that can be determined to belong to the identifiable set of traffic.

A device includes one or more processors and a non-transitory computer-readable storage medium. The non-transitory computer-readable storage medium has instructions which, when executed by the one or more processors, cause the device to implement a router network element that performs operations and that is to be part of a network including a SR network portion and a MPLS network portion. The router network element is to be part of (e.g., operate within) both the SR network portion and the MPLS network portion. The network also utilizes an IGP for exchanging routing information. The IGP is OSPF. The operations include receiving an IGP advertisement message originated by a mapping server. The IGP advertisement message includes a sub-TLV element that identifies a preferred type of path across the MPLS network portion for an identifiable set of traffic that is to be received from the SR network portion. The operations also include identifying, based at least in part upon the sub-TLV element, one path of a plurality of available paths across the MPLS network portion for the identifiable set of traffic. The operations also include configuring a forwarding plane of the router network element to utilize the identified one path to forward any received traffic from the SR network portion that can be determined to belong to the identifiable set of traffic.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments.

FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 6E illustrates the simple case of where each of the NDs implements a single NE, but a centralized control plane has abstracted multiple of the NEs in different NDs into (to represent) a single NE in one of the virtual network(s), according to some embodiments.

FIG. 6F illustrates a case where multiple VNEs are implemented on different NDs and are coupled to each other, and where a centralized control plane has abstracted these multiple VNEs such that they appear as a single VNE within one of the virtual networks, according to some embodiments.

DESCRIPTION OF EMBODIMENTS

Figure 1:
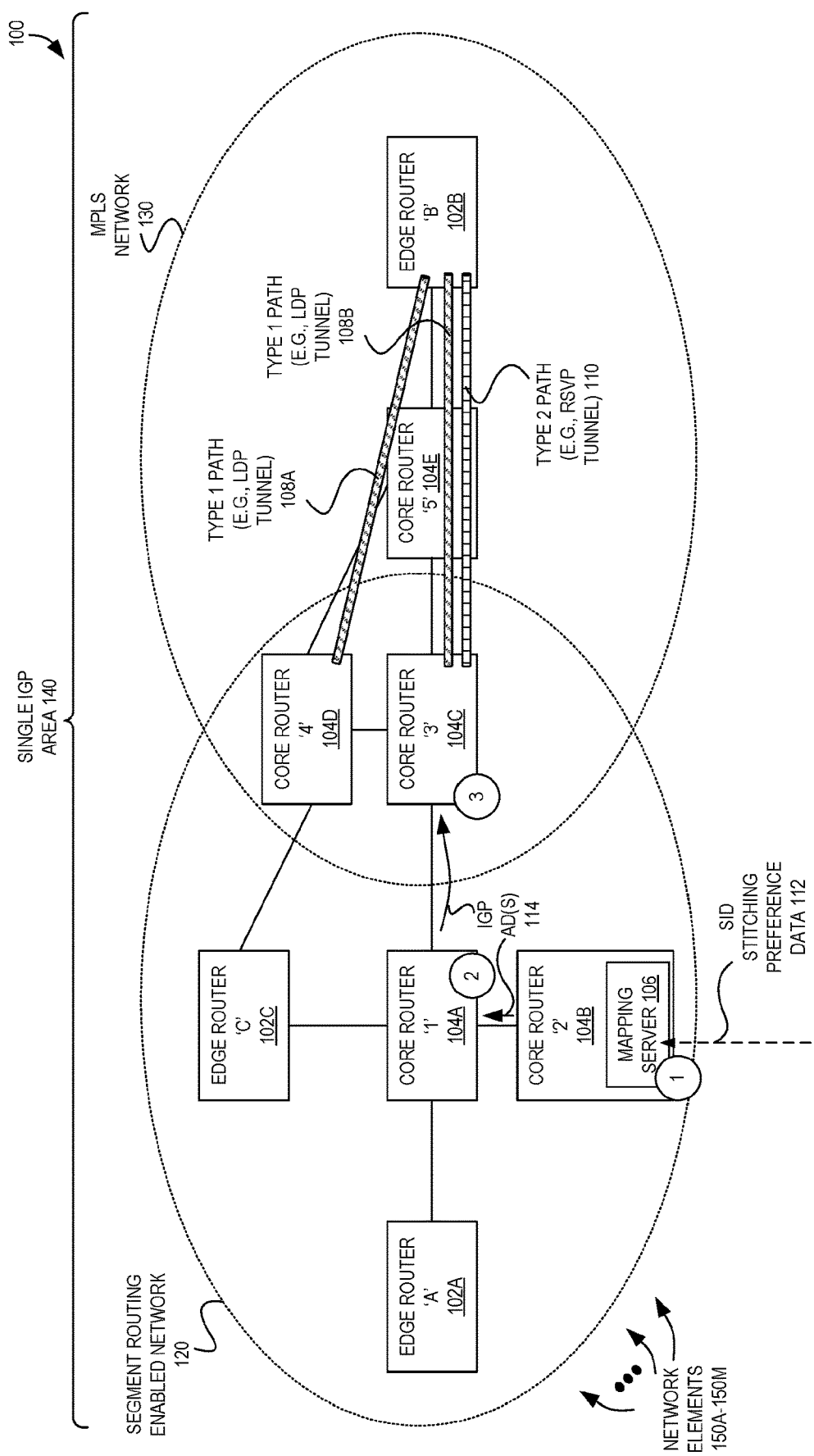
FIG. 1 is a high-level block diagram illustrating a system of router network elements communicatively coupled within a Segment Routing enabled network and an MPLS network utilizing flexible path stitching and selection for traffic transiting the Segment Routing and MPLS networks according to some embodiments.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to some embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As indicated in the background, techniques exist to interoperate SR domains and LDP domains in an area through what is referred to as a mapping server functionality, which is described in IETF Internet-Draft "Segment Routing interoperability with LDP" (draft-ietf-spring-segment-routing-ldp-interop-00), dated Oct. 14, 2015.

Mapping server prefixes advertised through mapping server Segment Identifiers (SIDs)—e.g., Extended Prefix Range TLVs in OSPF—represent the label information of non-SR nodes in an area/domain. This enables the "stitching" of SR labels to LDP labels at a border node where both SR and LDP are supported and provisioned.

However, mapping server prefixes are only described for providing interoperability between SR and LDP network portions. This creates a problem in real world contexts as the border node may have other MPLS clients (i.e., other than LDP) provisioned, such as Static MPLS, labeled BGP/bgp-3107, RSVP, etc. As there is no definitive mechanism defined for anything other than LDP to handle the mapping server prefixes, different border nodes might not be able to stitch a SR path to a particular MPLS path even though it is available for use. Moreover, there is no mechanism to indicate, by an operator, the preference of which MPLS path (or type of MPLS path) that is to be stitched at the border node through currently-defined mapping server SR extensions.

Accordingly, the following description describes techniques for enabling flexible path stitching and selection for traffic transiting Segment Routing and MPLS networks. In some embodiments, a path type preference can be indicated within an IGP advertisement, such as an OSPF or Intermediate System to Intermediate System (IS-IS) message. The path type preference, upon receipt by a network element acting within both a Segment Routing (SR) network portion and a MPLS network portion, can use the path type preference to select a path that adheres to the path type preference when determining a path through the MPLS network portion for traffic received from the SR network portion. Accordingly, a path preference can be accommodated to appropriately "stitch" together paths between SR and MPLS networks.

In some embodiments, the path type preference can identify a type of path or tunnel through the MPLS network, such as by indicating a preference for a Resource Reservation Protocol (RSVP) path, static MPLS path, labeled BGP path, etc.

In some embodiments, the path type preference can be provided by a mapping server utilized in the SR network portion, and can enable operators to exercise their preferences for traffic flowing between the MPLS network portion and the SR network portion. Accordingly, in some embodiments the interoperability between SR enabled network portions and traditional MPLS network portions (e.g., using RSVP, Labeled BGP, static MPLS labels, etc.) can be enhanced using IGP extensions together with the mapping server functionality of the segment routing architecture. Further, in some embodiments no backward compatibility issues result when compared to existing ways of doing stitching with LDP networks.

In some embodiments a new sub-TLV is utilized. The sub-TLV can be for the mapping server TLV in OSPF SR extensions (IETF Internet-Draft "OSPF Extensions for Segment Routing" (draft-ietf-ospf-segment-routing-extensions-05)), or can be for the mapping server TLV defined in IS-IS SR extensions (IETF Internet-Draft "IS-IS Extensions for Segment Routing" (draft-ietf-isis-segment-routing-extensions-06)). The new sub-TLV can provide a preference (if any) to choose a particular MPLS path to be provisioned while provisioning the mapping server prefixes in SR domain. This can allow a maintaining of requirements (e.g., from a Service Level Agreement (SLA)) such as bandwidth and/or delay on end-to-end paths for particular transport tunnels for a particular destination.

Accordingly, some embodiments can enable partial deployment of SR seamlessly in an existing MPLS network without any interoperability issues in a multi-vendor deployment environment, and can enable operators to maintain SLA network performance guarantees for certain prefixes.

FIG. 1 is a high-level block diagram illustrating a system 100 including router network elements 150A-150M communicatively coupled within a Segment Routing enabled network 120 and an MPLS network 130 utilizing flexible path stitching and selection for traffic transiting the Segment Routing and MPLS networks according to some embodiments. In this example, the plurality of network elements 150A-150M comprise three edge routers 102A-102C and multiple core routers 104A-104E that are coupled using the illustrated links.

SR to RSVP Mapping

In this example, we assume that an end-to-end Virtual Private Network (VPN) service (L3/L2) is to be established between edge router 'A' 102A and edge router 'B' 102B. As illustrated, only part of the network is SR enabled 120— edge router 'A' 102A, edge router 'C' 102C, core routers '1'-'4' 104A-104D. Additionally, a different part of the network has "traditional" LDP/RSVP provisioned—core routers '3'-'5' 104C-104E and edge router 'B' 102B—i.e., is a MPLS network 130. Thus, both core router '3' 104C and core router '4' 104D are capable of both SR and LDP/RSVP.

We also assume that two paths 108A-108B of a first type (e.g., LDP tunnel) are provisioned from the SR network 112 to the edge router 'B' 102B of the MPLS network 130, and that one path 110 of a second type (e.g., RSVP tunnel) is provisioned from the SR network 112 to the edge router 'B' 102B of the MPLS network 130.

In this illustrated example, core router '2' 104B is provisioned to function as a mapping server, and thus to advertise SR node SIDs (also referred to as "labels") for core router '5' 104E and edge router 'B' 102B in the single IGP area 140 (e.g., an OSPF domain, which all nodes participate in) as these network elements do not support SR.

First we describe the case where a service label from edge router 'B' 102B is learned by edge router 'A' 102A. To pass traffic from edge router 'A' 102A to edge router 'B' 102B, the first phase includes use of a SR path from edge router 'A' 102A until core router '3' 104C. For example, at edge router 'A' 102A, a next-hop for edge router 'B' 102B could be core router '1' 104A, i.e., node index of edge router 'B' 102B+the SRGB (Segment Routing Global Block) of core router '1' 104A.

When core router '3' 104C receives the binding (through binding SID as defined in the SR OSPF extensions), it has possibility to stitch the outgoing path towards edge router 'B' 102B with both a LDP label and RSVP label available in its forwarding path.

However, mapping server TLVs (OSPF extended range defined in OSPF extensions) are for LDP stitching, and thus SR path would be stitched to a LDP path. According to some embodiments using the extensions detailed here, it is possible to specify a preference by the operator in terms of the selected path—for example, it can say "prefer RSVP" (e.g., and thus, type 2 path 110) in the Mapping Server SID sub-TLV and core router '3' 104C can thus stitch the incoming SR path to a RSVP tunnel (e.g., type 2 path 110).

When core router '4' 104D receives the binding SID for edge router 'B' 102B, and as the only MPLS path available at core router '4' 104D is an LDP path (e.g., type 1 path 108A), a SR path would be stitched to LDP. Thus, a preference of "prefer RSVP" as described herein would not have any effect. A similar case results at edge router 'A' 102A, as no non-SR LSP path available for destination Forwarding Equivalence Class (FEC) edge router 'B' 102B exists.

Next, we describe the case where a service label from edge router 'A' 102A is learned by edge router 'B' 102B. At core router '3' 104C (which operates in both the SR network portion 120 and MPLS network portion 130), there won't be any LDP or RSVP binding available for edge router 'A'

102A from its neighbor core router '1' 104A. However, both LDP and RSVP "in-labels" towards edge router 'A' 102A can be stitched to the shortest path next-hop towards edge router 'A' 102A with SR SID/label advertised by edge router 'A' 102A (which is available at core router '3' 104C).

At core router '4' 104D, a LDP binding is not available towards edge router 'A' 102A from neighbor edge router 'C' 102C, but a SR node segment would be available for edge router 'A' 102A and would be used to stitch the LDP to SR path.

SR to Static MPLS Mapping

The above description (with regard to SR to RSVP mapping) equally applies if a statically-provisioned MPLS path is available, for example, at core router '4' 104D.

SR to Labeled BGP Tunnel Mapping

In seamless MPLS scenarios, stitching from a SR path to labeled BGP (iBGP+label) can happen at an Area Border Router (ABR). Thus, if the mapping server 106 advertises these prefixes with SR labels, these can be mapped to labeled BGP at the ABR.

IGP Extensions

Figure 2:
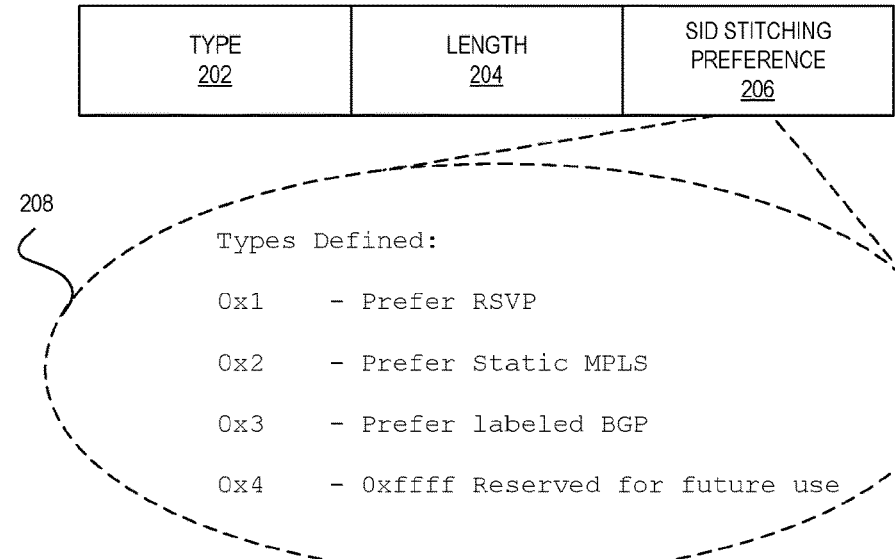
FIG. 2 illustrates a non-specific preference sub-TLV element, a specific preference sub-TLV element for OSPF, and a specific preference sub-TLV for IS-IS that can be used for enabling flexible path stitching and selection for traffic transiting the Segment Routing and MPLS networks according to some embodiments.
Figure 2:
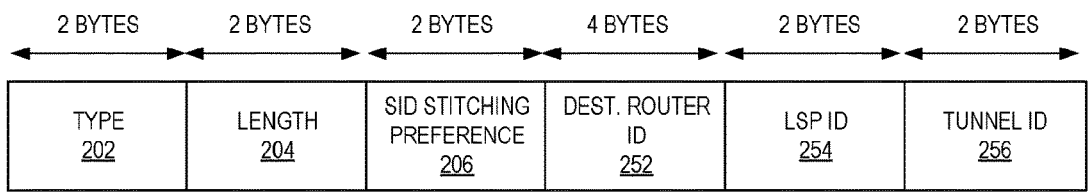
Figure 2:
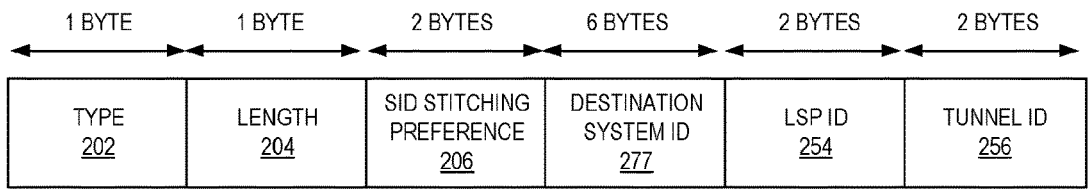

FIG. 2 illustrates a non-specific preference sub-TLV element 200, a specific preference sub-TLV element for OSPF 250, and a specific preference sub-TLV for IS-IS 275 that can be used for enabling flexible path stitching and selection for traffic transiting Segment Routing and MPLS networks according to some embodiments.

The non-specific preference sub-TLV element 200, when advertised in IGPs when multiple mapping servers are provisioned in an IGP area, all mapping servers advertise the same type of "preference" for a prefix, which is no different than previously-existing restrictions on the label value (i.e., it must be the same) when advertised from multiple mapping servers.

The non-specific preference sub-TLV element 200 includes a type 202, length 204, and a SID stitching preference 206. The type 202 can be a value that uniquely identifies the non-specific preference sub-TLV element 200 as being a non-specific preference sub-TLV element, and thus can be set by a standards body, etc. In some embodiments (e.g., in OSPF embodiments), the type 202 may be 2 bytes in size, though in other embodiments (e.g., in IS-IS embodiments), the type 202 may be 1 byte in size.

The non-specific preference sub-TLV element 200 also includes a length 204 value, which identifies a size of the "value" carried by the TLV—here, the SID stitching preference 206. In some embodiments (e.g., in OSPF embodiments), the length 204 may be 2 bytes in size, though in other embodiments (e.g., in IS-IS embodiments), the length 204 may be 1 byte in size.

The non-specific preference sub-TLV element 200 also includes the SID stitching preference 206, which in some embodiments is 2 bytes in size. The SID stitching preference 206 in a non-specific preference sub-TLV element 200 includes a value that can generically identify a type of path to be used, and thus in some embodiments does not identify a particular path itself. In the depicted embodiment, the value 208 of the SID stitching preference 206 can be as follows:

| VALUE | PREFERENCE |
|---|---|
| 0x1 | Prefer RSVP |
| 0x2 | PREFER STATIC MPLS |
| 0x3 | PREFER LABELED BGP |
| 0x4-0xffff | RESERVED |

Of course, these values and particular preferences are merely exemplary and are used in one embodiment, and many different values and preferences can be utilized in different embodiments.

FIG. 2 also illustrates a specific preference sub-TLV element for OSPF 250 and a specific preference sub-TLV for IS-IS 275. In contrast to the non-specific preference sub-TLV element 200 that includes a value that indicates a preferred type of path, these sub-TLV elements 250 and 275 can be used to identify a particular path itself.

Thus, by utilizing these sub-TLV elements 250 and 275, the mapping server can specify a particular LSP name and override the general preference described above for a particular destination. Multiple of these can be present in a system, but cannot have any duplication.

In the illustrated embodiment, the specific preference sub-TLV element for OSPF 250 includes a 2 byte type 202, a 2 byte length 204, a 2 byte SID stitching preference 206, a 4 byte destination router ID 252, a 2 byte LSP ID 254, and a 2 byte tunnel ID 256. In this embodiment, the destination router ID 252 can include 4 octets of the OSPF router-id for the destination, and the LSP ID 254 can include the 16-bit "LSP ID" identifier defined in IETF Request for Comments (RFC) 3209 (entitled "RSVP-TE: Extensions to RSVP for LSP Tunnels"), Section 4.6.2.1 for the "LSP_TUNNEL_IPv4 Sender Template Object." In some embodiments, a value of 0 is used when the LSP is not yet signaled.

Similarly, in some embodiments, the tunnel ID 256 can include the 16-bit "Tunnel ID" value defined in IETF RFC 3209, Section 4.6.1.1 for the "LSP_TUNNEL_IPv4 Session Object," which can remain constant over the lifetime of a tunnel.

Similarly, in a network utilizing IS-IS, the specific preference sub-TLV for IS-IS 275 can be utilized. The specific preference sub-TLV for IS-IS 275 includes a 1 byte type 202, a 1 byte length 204, a 2 byte SID stitching preference 206, a 6 byte destination system ID 277, a 2 byte LSP ID 254, and a 2 byte tunnel ID 256. Again, the type 202 can be a unique identifier that signifies that the sub-TLV is indeed a specific preference sub-TLV for IS-IS 275, and the length 204 and SID stitching preference 206 can be similar as described above. The destination system ID 277 can include, for example, 6 octets of IS-IS System-ID of length "ID Length," as defined in [International ISO/IEC STANDARD 10589, or "ISO 10589"]. Similarly, the LSP ID 254 can include the 16-bit "LSP ID" identifier defined in IETF RFC 3209, Section 4.6.2.1, for the "LSP_TUNNEL_IPv4 Sender Template Object," and a value of 0 is used if the LSP is not yet signaled. Additionally, the tunnel ID 256 can include the 16-bit "Tunnel ID" identifier defined in IETF RFC 3209, Section 4.6.1.1, for the "LSP_TUNNEL_IPv4 Session Object," where the tunnel ID can remain constant over the lifetime of a tunnel.

In some embodiments, the use of this additional specific sub-TLV 250/275 allows an operator to specify stitching preference for a particular border node and a particular LSP type as represented. This can be specifically useful to override the general preference and can be signaled through a controller depending on the dynamic characteristics of an LSP present at a particular node during run time.

Figure 3:
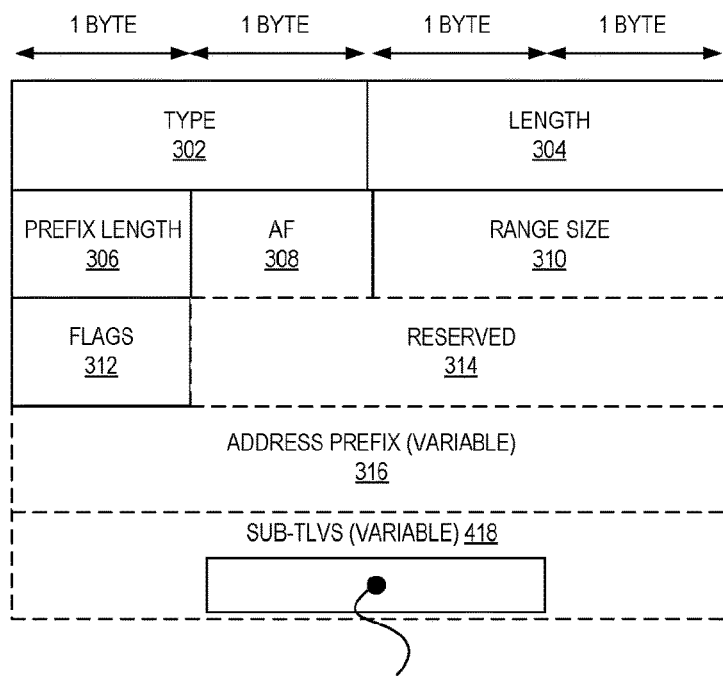
FIG. 3 illustrates an OSPF Extended Prefix Range TLV that can be utilized to carry the non-specific preference sub-TLV or specific preference sub-TLV for OSPF as illustrated in FIG. 2 according to some embodiments.

FIG. 3 illustrates an OSPF Extended Prefix Range TLV 300 that can be utilized to carry the non-specific preference sub-TLV or specific preference sub-TLV for OSPF as illustrated in FIG. 2 according to some embodiments. The OSPF Extended Prefix Range TLV 300 can be a version of that defined in IETF draft "draft-ietf-ospf-segment-routing-extensions-05" in the Extended Prefix LSA (link-state advertisement) modified to include the non-specific preference sub-TLV element 200 or the specific preference sub-TLV element for OSPF 250, as illustrated. This can be used, for example, in OSPFv2 environments.

Although not illustrated herein, for OSPFv3 these sub-TLVs can be carried by the OSPFv3 Extended Prefix Range TLV, as defined in IETF draft "draft-ietf-ospf-ospfv3-segment-routing-extensions-04". For OSPFv3, Extended Prefix Range TLV is a new top level TLV of the following LSAs defined in IETF Internet Draft "ietf-ospf-ospfv3-1sa-extend". Notably, the inclusion of the non-specific preference sub-TLV element 200 or the specific preference sub-TLV element for OSPF 250 can be optional, and when it is not present, the corresponding mapping server prefix can instead be used for LDP.

Figure 4:
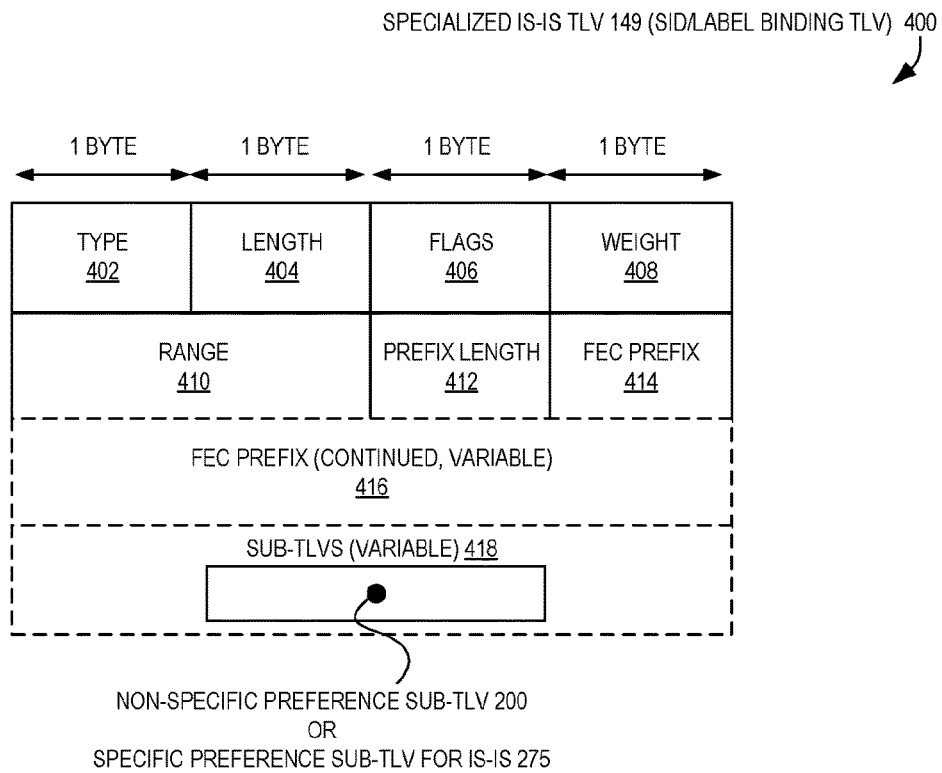
FIG. 4 illustrates a specialized IS-IS TLV 149 and a specialized IS-IS TLV 150 that can be utilized to carry the non-specific preference sub-TLV or specific preference sub-TLV for IS-IS as illustrated in FIG. 2 according to some embodiments.
Figure 4:
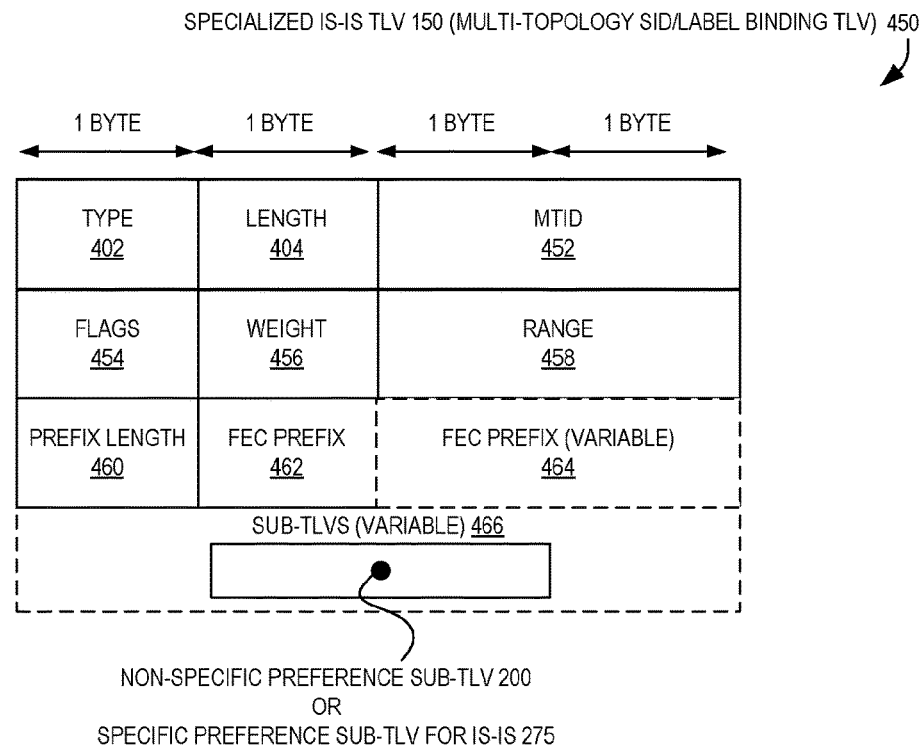

FIG. 4 illustrates a specialized IS-IS "TLV 149" (a SID/Label Binding TLV) 400 and a specialized IS-IS "TLV 150" (Multi-topology SID/Label Binding TLV) 450 that can be utilized to carry the non-specific preference sub-TLV 200 or specific preference sub-TLV 275 for IS-IS as illustrated in FIG. 2 according to some embodiments. These TLVs 400/450 can be based upon those defined in IETF Internet Draft "draft-ietf-isis-segment-routing-extensions-06", but modified to include the sub-TLVs 200/275 described herein. In some embodiments, the inclusion of this sub-TLV 200/275 is optional in IS-IS, and if it is not present, the corresponding mapping server prefix can be used for LDP.

Figure 5A:
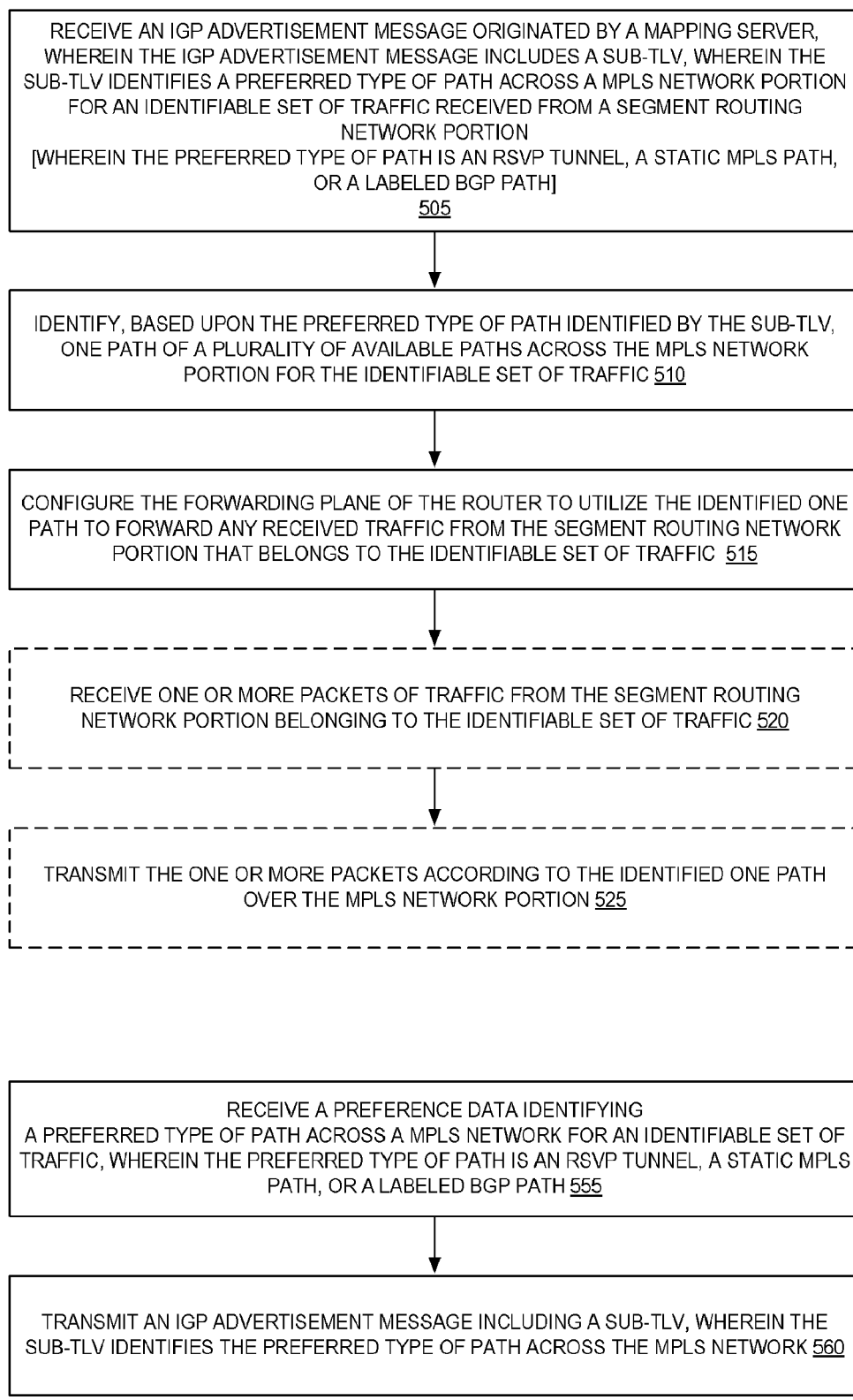
FIG. 5A illustrates two flows of operations for enabling flexible path stitching and selection for traffic transiting the Segment Routing and MPLS networks according to some embodiments.

FIG. 5A illustrates two flows 500/550 of operations for enabling flexible path stitching and selection for traffic transiting the Segment Routing and MPLS networks according to some embodiments. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

For example, the first flow 500 includes operations that can be performed by a router network element (e.g., core router '3' 104C of FIG. 1) that operates in a SR enabled network 120 portion and a MPLS network 130 portion, where both the SR enabled network 120 portion and the MPLS network 130 portion are in a single IGP area 140. The router network element could be implemented by a variety of types of devices, including but not limited to a special purpose network device 602, general purpose (Common Off the Shelf, or "COTS") computing (or network) device 604, hybrid network device 606, etc., which will be discussed further with regard to FIG. 6A et seq.

The flow 500 includes, at block 505, receiving (e.g., at a router coupled with a SR network portion and an MPLS network portion) an IGP advertisement message originated by a mapping server. The IGP advertisement message includes a sub-TLV that identifies a preferred type of path across the MPLS network portion for an identifiable set of traffic received from the SR network portion. In some embodiments, the IGP advertisement message comprises an OSPF or IS-IS message (e.g., an OSPFv2 or OSPFv3 LSA, IS-IS TLV such as TLV type 149 or 150, etc.). In some embodiments, the sub-TLV comprises the non-specific preference sub-TLV element 200, the specific preference sub-TLV element for OSPF 250, or the specific preference sub-TLV element for IS-IS 275 of FIG. 2. In some embodiments, the sub-TLV includes a value (e.g., a SID stitching preference 206) identifying a preferred type of path, such as an RSVP tunnel, a static MPLS path, a labeled BGP path, etc.

The flow 500 also includes, at block 510, identifying, based upon the preferred type of path identified by the sub-TLV, one path of a plurality of available paths across the MPLS network portion for the identifiable set of traffic. In some embodiments, block 510 includes identifying a preferred type of path from a SID stitching preference 206, and determining whether a path exists to the destination that is of that same type. In some embodiments, one path that exists that is of that same type is thus identified as the path to be across the MPLS network portion for the identifiable set of traffic. In some embodiments, upon a determination that no such path exists having a same type as the preferred type of path, another type of path is identified.

At block 515, the flow 500 includes configuring the forwarding plane of the router to utilize the identified one path to forward any received traffic from the SR network portion that belongs to the identifiable set of traffic. Block 515 can include installing or otherwise modifying forwarding/flow table entries in one or more line cards, for example, of the forwarding plane. In other embodiments, block 515 can include other operations known to those of skill in the art for enabling traffic forwarding, including but not limited to modifying forwarding/flow table entries stored in a memory for use by a software router, etc.

Optionally, as indicated by the dashed border of block 520, the flow 500 also includes receiving one or more packets of traffic from the SR network portion belonging to the identifiable set of traffic. Optionally, as indicated by the dashed border of block 525, the flow 500 includes transmitting the one or more packets according to the identified one path over the MPLS network portion, which can include transmitting the one or more packets using a physical network interface (e.g., of a line card), virtual network interface (e.g., between two software router network elements implemented by a same computing device), etc.

The second flow 550 illustrated by FIG. 5A includes operations that can be performed by a mapping server 106 (e.g., mapping server 106 of FIG. 1), which could be executed by an electronic device such as a special purpose network device 602, general purpose (COTS) computing (or network) device 604, hybrid network device 606, etc., which will be discussed further with regard to FIG. 6A et seq. The mapping server 106 can, in some embodiments, operate within the SR network portion 120.

The illustrated flow 550, at block 555, includes receiving a preference data identifying a preferred type of path across a MPLS network for an identifiable set of traffic. The preferred type of path can be an RSVP tunnel, a static MPLS path, or a labeled BGP path. Of course, in other embodiments, more, fewer, and/or different types of paths can be utilized.

The illustrated flow 550, at block 560, includes transmitting an IGP advertisement message including a sub-TLV that identifies the preferred type of path across the MPLS network. In some embodiments, the IGP advertisement message comprises an OSPF or IS-IS message (e.g., an OSPFv2 or OSPFv3 LSA, IS-IS TLV such as TLV type 149 or 150, etc.). In some embodiments, the sub-TLV comprises the non-specific preference sub-TLV element 200, the specific preference sub-TLV element for OSPF 250, or the specific preference sub-TLV element for IS-IS 275 of FIG. 2.

Figure 5B:
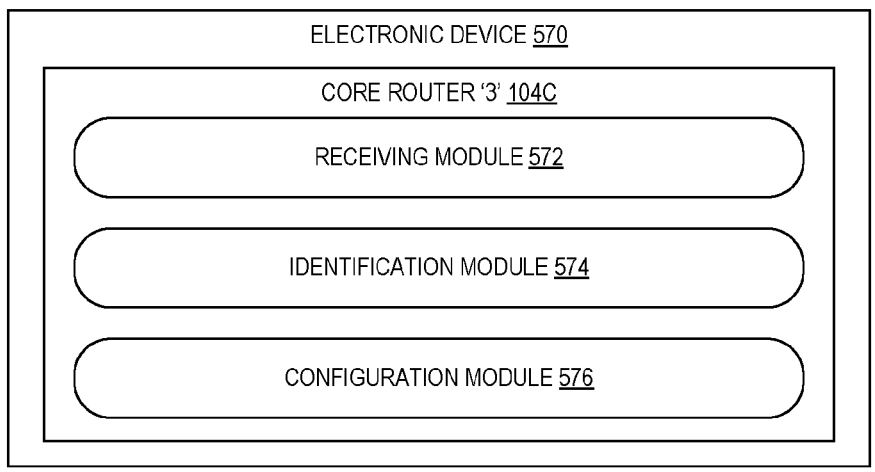
FIG. 5B illustrates a high-level block diagram 568 of a core router 104C, which in some embodiments can perform the flow 500 of FIG. 5A, according to some embodiments.

FIG. 5B illustrates a high-level block diagram 568 of a core router 104C, which in some embodiments can perform the flow 500 of FIG. 5A, according to some embodiments.

It is not strictly necessary that each module depicted herein be implemented as physically separate units. Some or all modules may be combined in a physical unit. Also, the modules need not be implemented strictly in hardware. It is envisioned that the units may be implemented through a combination of hardware and software. For example, the electronic device 570 may include one or more central processing units executing program instructions stored in a non-transitory storage medium or in firmware to perform the functions of the modules.

The electronic device 570 can implement a core router 104C and include a receiving module 754, identification module 574, and/or configuration module 576.

The receiving module 572 can be adapted to receive an IGP advertisement message (e.g., an OSPF advertisement message) originated by a mapping server. The IGP advertisement message (e.g., OSPF advertisement message) includes a sub-TLV, where the sub-TLV identifies a preferred type of path across an MPLS network portion for an identifiable set of traffic received from a segment routing network portion. In some embodiments, the preferred type of path is an RSVP tunnel, a static MPLS path, or a labeled BGP path. In some embodiments, the receiving module 572 can perform block 505 of flow 500 of FIG. 5A.

The identification module 574 can be adapted to identify, based upon the preferred type of path identified by the sub-TLV, one path of a plurality of available paths across the MPLS network portion for the identifiable set of traffic. In some embodiments, the identification module 574 can perform block 510 of flow 500 of FIG. 5A.

The configuration module 576 can be adapted to configure the forwarding plane of the core router to utilize the identified one path to forward any received traffic from the segment routing network portion that belongs to the identifiable set of traffic. In some embodiments, the configuration module 576 can perform block 515 of flow 500 of FIG. 5A.

In some embodiments, the electronic device 570 can include other non-illustrated modules, such as one or modules to perform blocks 520 and/or 525 of flow 500 of FIG. 5A, and possibly can include other non-illustrated modules to perform other operations disclosed herein. Thus, the depicted embodiment is illustrative and not limiting.

Figure 5C:
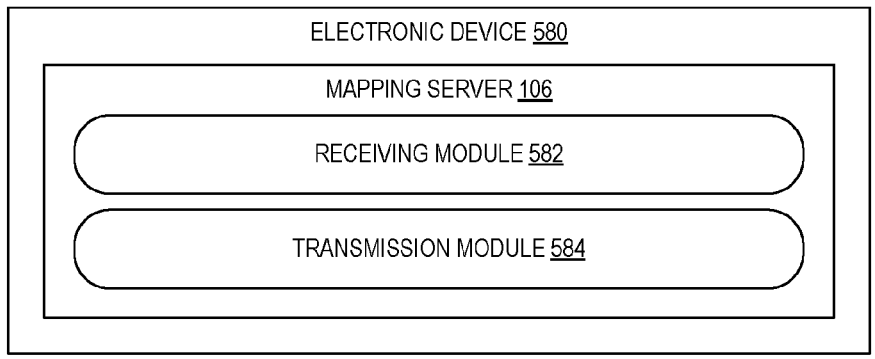
FIG. 5C illustrates a high-level block diagram 578 of a mapping server 106, which in some embodiments can perform the flow 550 of FIG. 5A, according to some embodiments.

FIG. 5C illustrates a high-level block diagram 578 of a mapping server 106, which in some embodiments can perform the flow 550 of FIG. 5A, according to some embodiments.

It is not strictly necessary that each module depicted herein be implemented as physically separate units. Some or all modules may be combined in a physical unit. Also, the modules need not be implemented strictly in hardware. It is envisioned that the units may be implemented through a combination of hardware and software. For example, the electronic device 580 may include one or more central processing units executing program instructions stored in a non-transitory storage medium or in firmware to perform the functions of the modules.

The electronic device 580 can implement a mapping server 106 and include a receiving module 582 and/or transmission module 584.

The receiving module 582 can be adapted to receive a preference data identifying a preferred type of path across a MPLS network for an identifiable set of traffic, where the preferred type of path is an RSVP tunnel, a static MPLS path, or a labeled BGP path. In some embodiments, the receiving module 582 can perform block 555 of flow 550 of FIG. 5A.

The transmission module 584 can be adapted to transmit an IGP advertisement message (e.g., an OSPF advertisement message) including a sub-TLV, where the sub-TLV identifies the preferred type of path across the MPLS network. In some embodiments, the transmission module 584 can perform block 560 of flow 550 of FIG. 5A.

In some embodiments, the electronic device 580 can include other non-illustrated modules to perform other operations disclosed herein. Thus, the depicted embodiment is illustrative and not limiting.

As described herein, some embodiments utilize electronic devices. An electronic device can store and/or transmit (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, many electronic devices (e.g., a computer or "computing device") can include hardware and software, such as a set of one or more processors coupled to one or more machine-readable storage media to store code for execution on the set of processors and/or to store data.

For example, an electronic device can include non-volatile memory containing code, as non-volatile memory can persist code/data even when the electronic device is turned off (when power is removed). While the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Many electronic devices also include a set or one or more physical network interface(s) to establish network connections (to transmit and/or receive code and/or data using propagating signals) or otherwise communicate with other electronic devices. One or more parts of various embodiments described herein can be implemented using different combinations of software, firmware, and/or hardware.

A network device (ND) is an electronic device that communicatively interconnects other electronic devices (e.g., other network devices, end-user devices) in one or more networks. Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 6A:
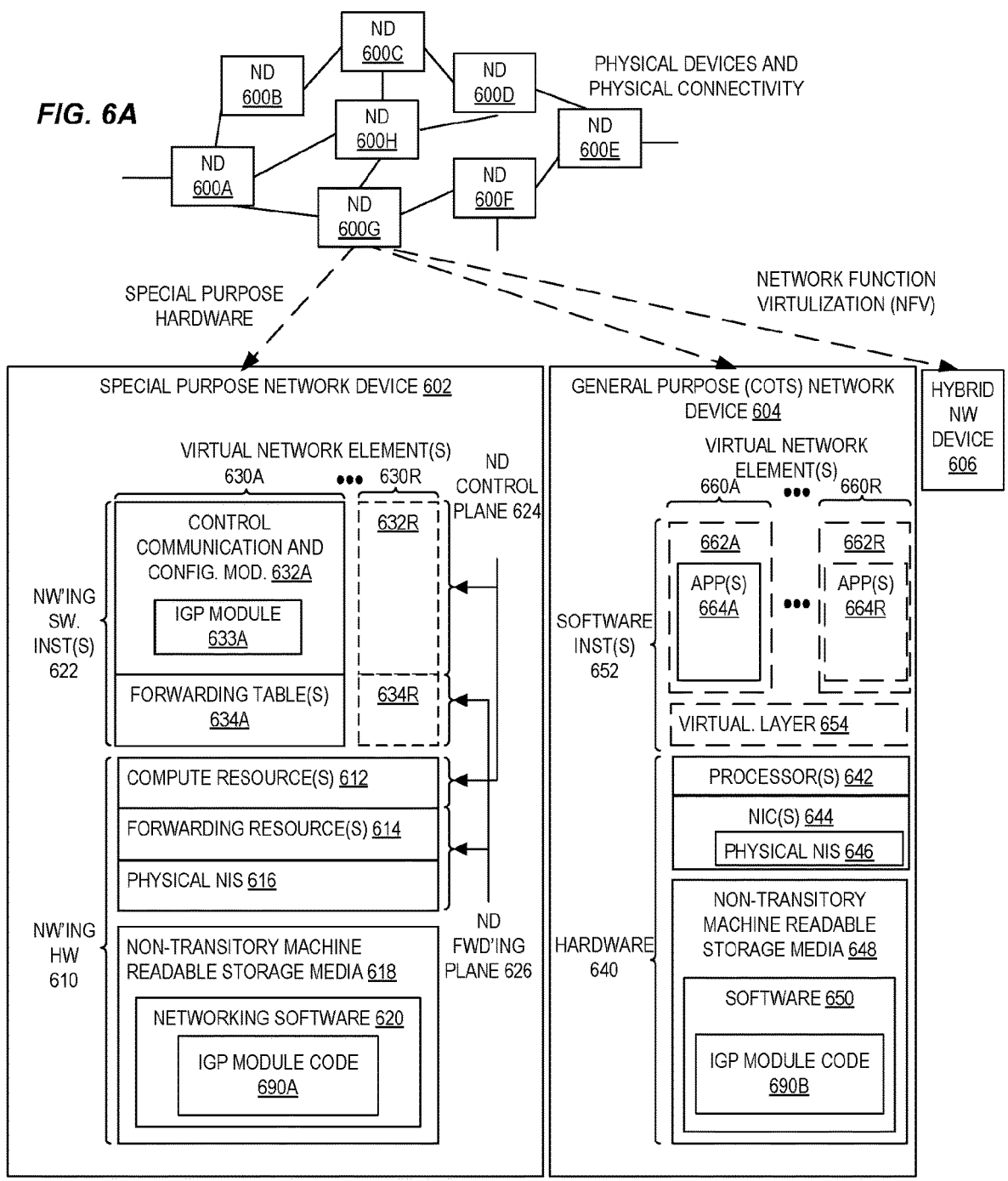
FIG. 6A illustrates connectivity between network devices (NDs) within an exemplary network, as well as three exemplary implementations of the NDs according to some embodiments.

FIG. 6A illustrates connectivity between network devices (NDs) within an exemplary network, as well as three exemplary implementations of the NDs, according to some embodiments. FIG. 6A shows NDs 600A-600H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F (and not illustrating as ending at a terminus) illustrates that these NDs act as ingress and egress points for the network and thus, these NDs are sometimes referred to as "edge" NDs while the other NDs may be called "core" NDs.

Two of the exemplary ND implementations in FIG. 6A are: 1) a special-purpose network device 602 that can include custom application—specific integrated—circuits (ASICs) and a special-purpose operating system (OS); and 2) a general-purpose network device 604 that can use common off-the-shelf (COTS) components (e.g., processors) and a potentially a "standard" OS.

The special-purpose network device 602 includes networking hardware 610 comprising compute resource(s) 612 (typically including a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620.

The networking software 620 can, in some embodiments, include IGP module code 690A useful for implementing an IGP module 633A that can perform operations disclosed herein, including the operations of the flows 500/550 of FIG. 5A and discussed throughout this description.

A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-600H.

During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), can form a (separate) virtual network element 630A-630R. Each of the virtual network element(s) (VNEs) 630A-630R includes a control communication and configuration module 632A-632R (sometimes referred to as a local control module or control communication module) and forwarding table(s) 634A-634R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

In some embodiments, one or more of the control communication and configuration modules (e.g., 632A) of the virtual network element(s) (VNEs) 630A-630R can include an IGP module 633A instantiated or implemented by the execution of the IGP module code 690A.

The special-purpose network device 602 is often physically and/or logically considered to include: 1) a ND control plane 624 (sometimes referred to as a control plane) comprising the compute resource(s) 612 that execute the control communication and configuration module(s) 632A-632R; and 2) a ND forwarding plane 626 (sometimes referred to as a forwarding plane, a data plane, or a media plane) comprising the forwarding resource(s) 614 that utilize the forwarding table(s) 634A-634R and the physical NIs 616. By way of example, where the ND is a router (or is implementing routing functionality), the ND control plane 624 (the compute resource(s) 612 executing the control communication and configuration module(s) 632A-632R) is typically responsible for participating in controlling how data (e.g., packets) is to be routed (e.g., the next hop for the data and the outgoing physical NI for that data) and storing that routing information in the forwarding table(s) 634A-634R, and the ND forwarding plane 626 is responsible for receiving that data on the physical NIs 616 and forwarding that data out the appropriate ones of the physical NIs 616 based on the forwarding table(s) 634A-634R.

Figure 6B:
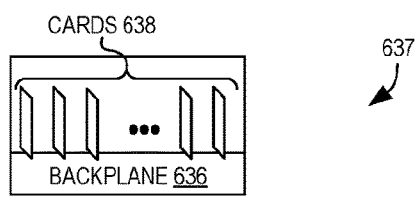
FIG. 6B illustrates an exemplary way to implement a special-purpose network device according to some embodiments.

FIG. 6B illustrates an exemplary way to implement the special-purpose network device 602 according to some embodiments. FIG. 6B illustrates a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650.

The software 650 can include IGP module code 690B that can be executed by the processor(s) 642 to implement an IGP module (not illustrated), which may be part of application(s) 664A-664R, in order to perform the operations described herein.

During operation, the processor(s) 642 execute the software 650 to instantiate one or more sets of one or more applications 664A-664R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-662R called software containers that may each be used to execute one (or more) of the sets of applications 664A-664R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-664R is run on top of a guest operating system within an instance 662A-662R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-662R, or as a combination of unikernels and the above-described techniques (e.g., unikernels and virtual machines both run directly on a hypervisor, unikernels and sets of applications that are run in different software containers).

The instantiation of the one or more sets of one or more applications 664A-664R, as well as virtualization if implemented, are collectively referred to as software instance(s) 652. Each set of applications 664A-664R, corresponding virtualization construct (e.g., instance 662A-662R) if implemented, and that part of the hardware 640 that executes them (be it hardware dedicated to that execution and/or time slices of hardware temporally shared), forms a separate virtual network element(s) 660A-660R.

The virtual network element(s) 660A-660R perform similar functionality to the virtual network element(s) 630A-630R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 662A-662R corresponding to one VNE 660A-660R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-662R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-662R and the NIC(s) 644, as well as optionally between the instances 662A-662R; in addition, this virtual switch may enforce network isolation between the VNEs 660A-660R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-630R, VNEs 660A-660R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, Global Positioning System (GPS) units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-662R may operate as servers; the same would be true for the hybrid network device 606; in the case of the special-purpose network device 602, one or more such servers could also be run on a virtualization layer executed by the compute resource(s) 612; in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an IETF MPLS or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., BGP/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments. Specifically, FIG. 6D illustrates network elements (NEs) 670A-670H with the same connectivity as the NDs 600A-H of FIG. 6A.

FIG. 6D illustrates that the distributed approach 672 distributes responsibility for generating the reachability and forwarding information across the NEs 670A-670H; in other words, the process of neighbor discovery and topology discovery is distributed.

For example, where the special-purpose network device 602 is used, the control communication and configuration module(s) 632A-632R of the ND control plane 624 typically include a reachability and forwarding information module to implement one or more routing protocols (e.g., an exterior gateway protocol such as BGP, Interior Gateway Protocol(s) (IGP) (e.g., OSPF, IS-IS, Routing Information Protocol (RIP), LDP, Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-670H (e.g., the compute resource(s) 612 executing the control communication and configuration module(s) 632A-632R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-634R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-670H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-670H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-632R of the ND control plane 624 typically include a control agent that provides the VNE side of the south bound interface 682. In this case, the ND control plane 624 (the compute resource(s) 612 executing the control communication and configuration module(s) 632A-632R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-632R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-660R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-660R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-670H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-670H, it should be understood that the network control approaches described with reference to FIG. 6D also work for networks where one or more of the NDs 600A-H implement multiple VNEs (e.g., VNEs 630A-630R, VNEs 660A-660R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-670H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multi-protocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a device implementing a router network element, wherein the router network element is part of a network including a Segment Routing (SR) network portion and a Multiprotocol Label Switching (MPLS) network portion, wherein the router network element is part of both the SR network portion and the MPLS network portion, and wherein the network also utilizes an Open Shortest Path First (OSPF) protocol for exchanging routing information, the method comprising:

receiving, at the router network element, an OSPF advertisement message originated by a mapping server, wherein the OSPF advertisement message includes a sub-Type-length-value (sub-TLV) element that identifies a preferred type of path across the MPLS network portion for an identifiable set of traffic that is to be received from the SR network portion;

receiving, at the router network element from another network element operating in the SR network portion but not in the MPLS network portion, one or more packets that belong to the identifiable set of traffic;

identifying, by the router network element based at least in part upon the sub-TLV element, one path of a plurality of available paths across the MPLS network portion for the identifiable set of traffic;

configuring, by the router network element, a forwarding plane of the router network element to utilize the identified one path to forward any received traffic from the SR network portion that can be determined to belong to the identifiable set of traffic; and transmitting, by the router network element, the one or more packets according to the identified one path over the MPLS network portion.

2. The method of claim 1, wherein the preferred type of path comprises an RSVP tunnel, a static MPLS path, or a labeled Border Gateway Protocol (BGP) path.

3. The method of claim 1, wherein the sub-TLV element is carried by an OSPF Extended Prefix Range TLV.

4. The method of claim 3, wherein:
the sub-TLV element includes a Segment Identifier (SID) value that identifies the preferred type of path but does not uniquely identify a specific path; and
the identifying the one path is based upon the SID value.

5. The method of claim 3, wherein:
the sub-TLV element includes a LSP value and a tunnel identifier (ID) value;
the sub-TLV element identifies a specific path across the MPLS network portion; and
the identifying the one path is based upon the LSP value and the tunnel ID value.

6. A non-transitory computer-readable storage medium having instructions which, when executed by one or more processors of an electronic device, cause the electronic device to implement a router network element that performs operations and that is to be part of a network including a Segment Routing (SR) network portion and a Multiprotocol Label Switching (MPLS) network portion, wherein the router network element is to be part of both the SR network portion and the MPLS network portion, and wherein the network also utilizes an Open Shortest Path First (OSPF) protocol for exchanging routing information, the operations comprising:

receiving an OSPF advertisement message originated by a mapping server, wherein the OSPF advertisement message includes a sub-Type-length-value (sub-TLV) element that identifies a preferred type of path across the MPLS network portion for an identifiable set of traffic that is to be received from the SR network portion;

receiving, from another network element operating in the SR network portion but not in the MPLS network portion, one or more packets that belong to the identifiable set of traffic;

identifying, based at least in part upon the sub-TLV element, one path of a plurality of available paths across the MPLS network portion for the identifiable set of traffic;

configuring a forwarding plane of the router network element to utilize the identified one path to forward any received traffic from the SR network portion that can be determined to belong to the identifiable set of traffic; and transmitting the one or more packets according to the identified one path over the MPLS network portion.

7. The non-transitory computer-readable storage medium of claim 6, wherein the preferred type of path comprises an RSVP tunnel, a static MPLS path, or a labeled Border Gateway Protocol (BGP) path.

8. The non-transitory computer-readable storage medium of claim 6, wherein the sub-TLV element is carried by an OSPF Extended Prefix Range TLV.

9. The non-transitory computer-readable storage medium of claim 8, wherein:
the sub-TLV element includes a Segment Identifier (SID) value that identifies the preferred type of path but does not uniquely identify a specific path; and
the identifying the one path is based upon the SID value.

10. The non-transitory computer-readable storage medium of claim 8, wherein:
the sub-TLV element includes a LSP value and a tunnel identifier (ID) value;
the sub-TLV element identifies a specific path across the MPLS network portion; and
the identifying the one path is based upon the LSP value and the tunnel ID value.

11. A device, comprising:
one or more processors; and
a non-transitory computer-readable storage medium having instructions which, when executed by the one or more processors, cause the device to implement a router network element that is to be part of a network including a Segment Routing (SR) network portion and a Multiprotocol Label Switching (MPLS) network portion, wherein the router network element is to be part of both the SR network portion and the MPLS network portion, and wherein the network also utilizes an Open Shortest Path First (OSPF) protocol for exchanging routing information, wherein the router network element is adapted to:
receive an OSPF advertisement message originated by a mapping server, wherein the OSPF advertisement message includes a sub-Type-length-value (sub-TLV) element that identifies a preferred type of path across the MPLS network portion for an identifiable set of traffic that is to be received from the SR network portion,
receive, from another network element operating in the SR network portion but not in the MPLS network portion, one or more packets that belong to the identifiable set of traffic;
identify, based at least in part upon the sub-TLV element, one path of a plurality of available paths across the MPLS network portion for the identifiable set of traffic,
configure a forwarding plane of the router network element to utilize the identified one path to forward any received traffic from the SR network portion that can be determined to belong to the identifiable set of traffic; and
transmit the one or more packets according to the identified one path over the MPLS network portion.

12. The device of claim 11, wherein the preferred type of path comprises an RSVP tunnel, a static MPLS path, or a labeled Border Gateway Protocol (BGP) path.

13. The device of claim 11, wherein the sub-TLV element is carried by an OSPF Extended Prefix Range TLV.

14. The device of claim 13, wherein:
the sub-TLV element includes a Segment Identifier (SID) value that identifies the preferred type of path but does not uniquely identify a specific path; and
the identifying the one path is based upon the SID value.

15. The device of claim 13, wherein:
the sub-TLV element includes a LSP value and a tunnel identifier (ID) value;
the sub-TLV element identifies a specific path across the MPLS network portion; and
the identifying the one path is based upon the LSP value and the tunnel ID value.

* * * * *

UNITED STATES PATENT AND TRADEMARK OFFICE
CERTIFICATE OF CORRECTION

PATENT NO. : 10,785,148 B2  
APPLICATION NO. : 16/077837  
DATED : September 22, 2020  
INVENTOR(S) : Uma S. Chunduri et al.

Page 1 of 1

It is certified that error appears in the above-identified patent and that said Letters Patent is hereby corrected as shown below:

On the Title Page

Item (54) and in the Specification Column 1, Line 2:
"OSPF EXTENSIONS FOR FLEXIBLE PATH STITCHNG AND SELECTION FOR TRAFFIC TRANSITING SEGMENT ROUTING AND MPLS NETWORKS"

Should read:
-- OSPF EXTENSIONS FOR FLEXIBLE PATH STITCHING AND SELECTION FOR TRAFFIC TRANSITING SEGMENT ROUTING AND MPLS NETWORKS --

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*